Figure 3:
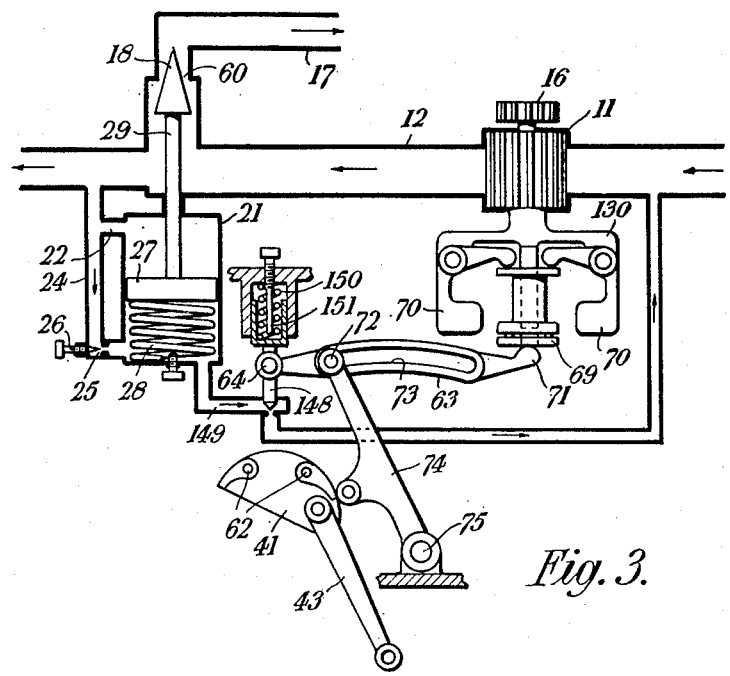

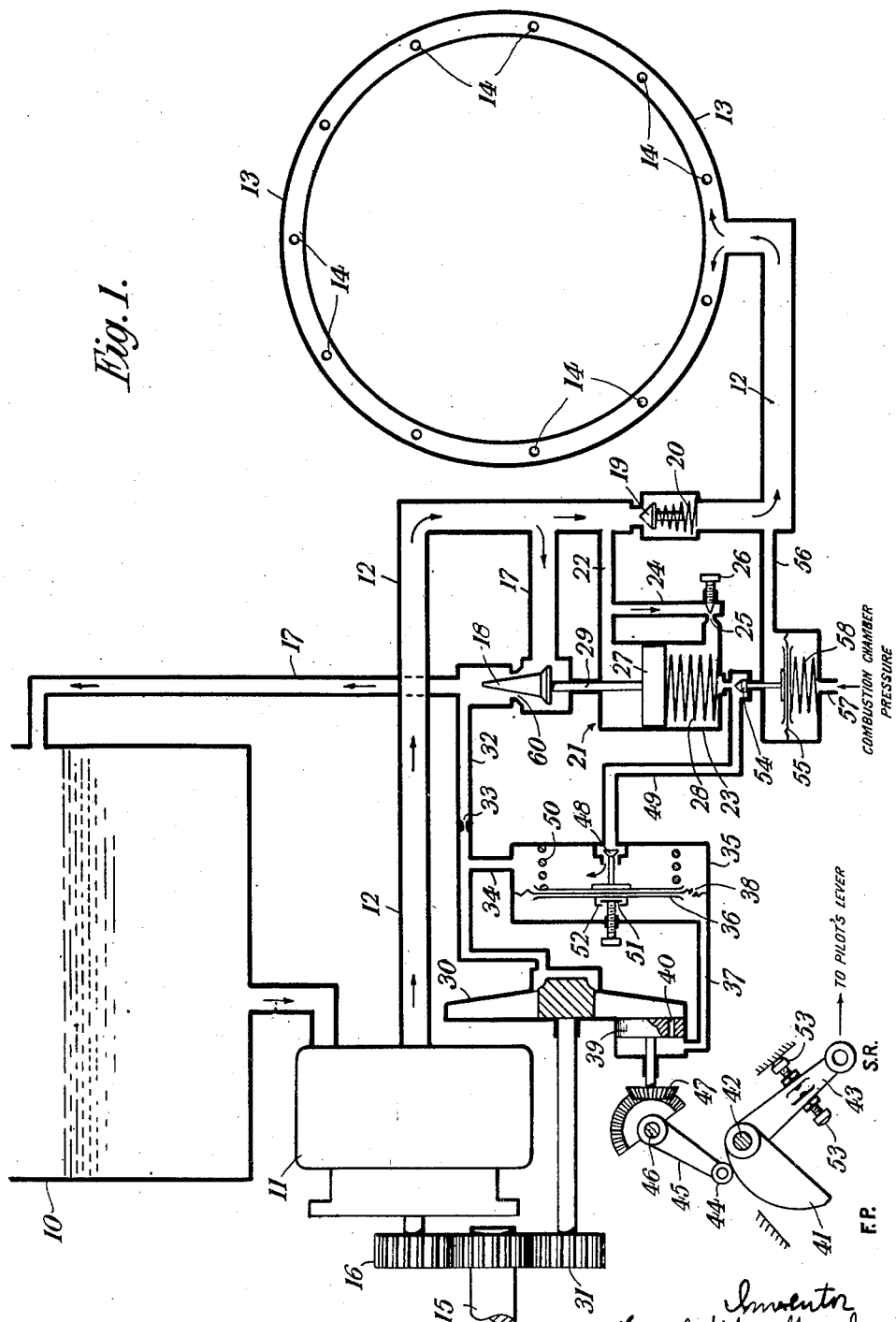

July 29, 1952  L. S. GREENLAND  2,604,756
FUEL SUPPLY SYSTEM FOR INTERNAL-COMBUSTION ENGINES
Filed April 18, 1946  3 Sheets-Sheet 2

Inventor
Leonard Sidney Greenland
By Mason, Nolte, Crum & Berry
Attys.

Patented July 29, 1952

2,604,756

UNITED STATES PATENT OFFICE 2,604,756

FUEL SUPPLY SYSTEM FOR INTERNAL-COMBUSTION ENGINES

Leonard Sidney Greenland, Weston-Super-Mare, England, assignor to H. M. Hobson Limited, London, England, a company of Great Britain Application April 18, 1946, Serial No. 663,180
In Great Britain May 3, 1945

13 Claims. (Cl. 60—39.28)

This invention relates to means for controlling the speed of an internal combustion engine, and has for its object to provide a system in which, by regulation of the rate of flow of fuel into the engine, the engine may be caused to run at any selected speed within a predetermined range irrespective of variations in altitude, forward speed of the aircraft (in the case of an aircraft engine) or other factors which may influence the speed of the engine. Furthermore, it aims to maintain a degree of controlling sensitivity which is constant throughout the speed range.

The invention provides, in an engine or the like, the combination with a member for controlling the engine speed in R. P. M. of a biasing device for applying a substantially constant biasing pressure to the speed controlling member, a governor for applying to the speed controlling member a force, which varies with engine speed and acts thereon in opposition to and normally balances the biasing pressure, the speed controlling member being effective, by varying the engine speed when said force changes in value, to maintain the force in balance with the biasing pressure, and manually operable speed-selecting means for adjusting the relationship between engine speed and the force aforesaid, and so changing the engine speed at which said force will balance the biasing pressure.

In a preferred embodiment, the invention provides, in an internal combustion engine, the combination with a hydraulic servomotor, means controlled by the servo member thereof for varying the rate of flow of fuel to the engine, a biasing device for applying a substantially constant biasing pressure to the control value of the servomotor, a governor for applying to the valve a force which varies with engine speed and acts in opposition to the biasing pressure, the servo member acting in response to variations in engine speed to adjust the fuel flow so as to maintain the engine speed at a selected value at which the force applied to the valve by the governor balances the biasing pressure, and manually operable speed-selecting means for adjusting the relationship between engine speed and the force applied to the valve by the governor, and thereby changing the selected engine speed.

The hydraulic servomotor may be either of the piston type, embodying a servo member constituted by a piston arranged to move in a cylinder under the control of the control valve or of the vane type. While I prefer to employ a servomotor for regulating the fuel flow to the engine under the conjoint control of the governor and of the biasing device, this may in some cases be omitted, the valve serving to regulate the fuel flow directly instead of through the agency of a servo member. An arrangement of this character is described in my United States application Serial No. 601,602, now abandoned, although in the case of that application the speed selecting means operates to vary the biasing force applied to the valve and not the relationship between engine speed and the force applied to the valve by the governor.

In one form of the invention the governor is constituted by an engine-driven centrifugal impeller, the pressure difference developed by which is employed as the force for balancing the control valve against the load of the biasing device, and is applied across a diaphragm or equivalent pressure-sensitive device linked to the control valve, and the speed-selecting means is constituted by a valve for varying the radial distance from the axis of the impeller of the aperture at which the higher pressure is registered in the impeller. Alternately the impeller may be of fixed radius and the speed-selecting means be constituted by a valve controlling the effective area of an orifice in a conduit external to the impeller and connecting the eye and tip thereof, the pressure difference developed across the diaphragm by the impeller being determined by the position of the valve.

In another construction, the governor is a centrifugal governor operating on the control valve through the agency of a mechanical linkage, incorporating a fulcrum which is adjustable in position by the speed-selecting means.

In all cases, the governor has the advantage that its sensitivity is constant whatever the selected speed. This is because the force exerted by the governor on the control valve, whether it be a hydraulic pressure difference or a mechanical force, is always restored to the same value irrespective of the speed selected. Thus a given percentage speed change produces the same response from the valve whatever the controlling speed, and the valve movement is used as a means for altering the fuel flow so as to maintain the speed constant at the value determined by the setting of the speed-selecting means, i. e. the effective radius of the impeller or the position of the fulcrum as the case may be.

In the preferred form of the invention, the servo piston is exposed to a fluid pressure difference and balanced against it by a spring, the control valve controlling a leakage orifice at the low pressure end of the servo cylinder, which is connected to the high pressure end by a by-pass pipe embodying an adjustable restriction. On accelerating movement of the speed-selecting means, the valve moves to close this leakage orifice, and the responsive movement of the servo piston to increase the fuel flow is retarded due to the restriction to flow of liquid through the by-pass pipe.

This feature is of particular importance in combustion turbine engines, as it avoids an excessive surge of fuel on acceleration, which might lead to damage to the turbine due to the permissible upper limit of temperature in the turbine being exceeded. This danger of overheating has, with certain existing installations, imposed the need for moving the speed-selecting lever slowly towards the open or full power position, a restriction which is a disadvantage during rapid manoeuvres with an aircraft. By the use of the above-described delayed action servomotor the pilot can be relieved of this worry; the mechanism automatically delivering excess fuel to the turbine during periods of acceleration while nevertheless avoiding such a surge of fuel as would endanger the turbine.

Figure 2:
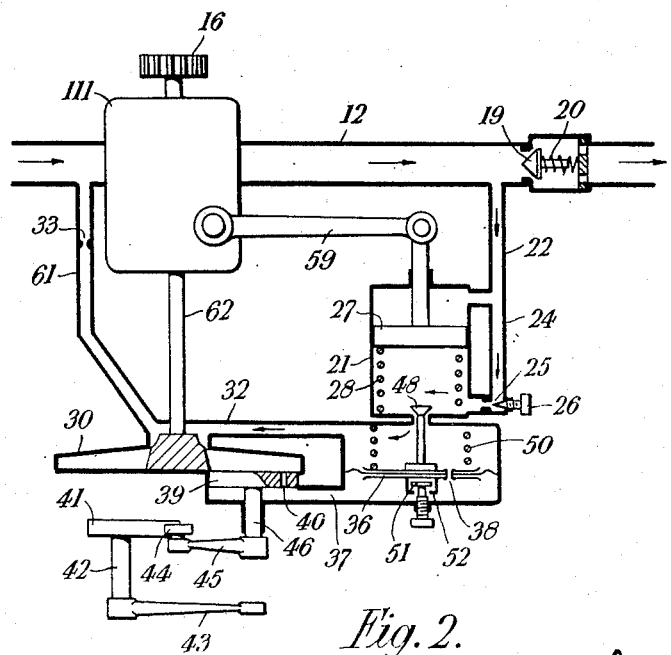
Figure 4:
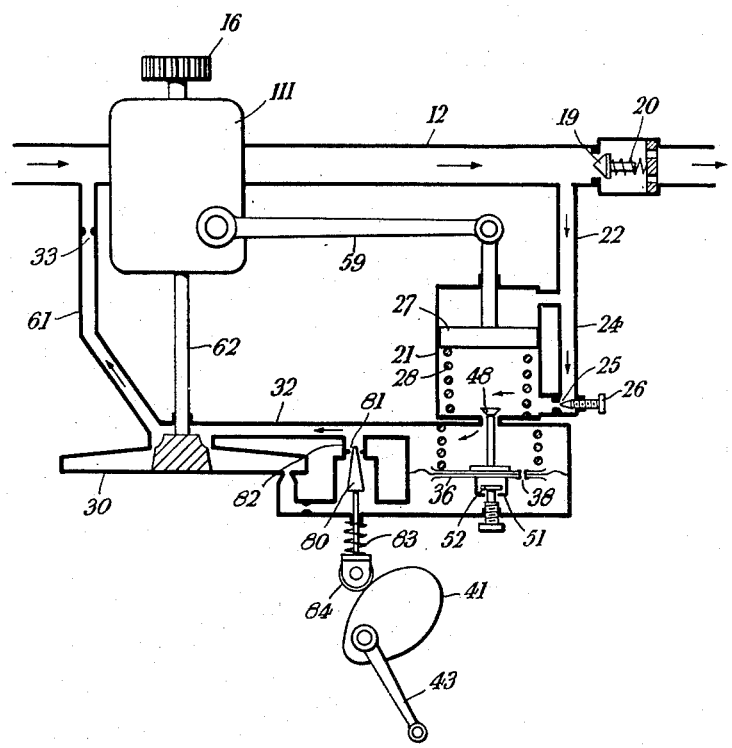

Four embodiments of the invention, as applied to combustion turbine engines for aircraft, will now be described in detail, by way of example, with reference to the accompanying diagrammatic drawings, in which:

Fig. 1 is a diagrammatic lay-out of the first installation, in which the fuel flow is controlled by a hydraulic governor and metering valve, Fig. 2 is a diagrammatic lay-out of an alternative installation in which the hydraulic governor controls the delivery of a variable displacement pump, Fig. 3 is a diagrammatic lay-out of a further alternative installation embodying a centrifugal governor, and Fig. 4 is a diagrammatic lay-out of an arrangement similar to that in Fig. 2 but employing different speed-selecting means.

Like reference characters denote like parts throughout the figures.

In the arrangement shown in Fig. 1, fuel is fed from a tank 10 by a fixed delivery fuel pump 11 along a conduit 12 to a distributing gallery 13 from which it is fed to the engine through injection nozzles indicated diagrammatically at 14. The nozzles 14 may have fixed or variable orifices. The pump 11 is driven from the engine shaft 15 by gearing 16.

A branch pipe 17 having a metering orifice 60, controlled by a metering needle valve 18, returns excess fuel to the tank. In the main delivery conduit 12 leading to the distributing gallery 13 is a valve 19, loaded by a spring 20. The valve 19 ensures that the pump delivery pressure is sufficient to operate the servomotor 21 under all conditions of fuel flow. A pipe 22 leads from the conduit 12 on the high pressure side of the valve 19 to one end of servo cylinder 23. The two ends of the cylinder are connected by a pipe 24 embodying a restriction 25 which is adjustable by a screw 26. The pipe 24 can, if desired, be replaced by a small through-going orifice in the servo piston 27.

At the low pressure end of the cylinder 23 is a compression spring 28 which acts on the servo piston 27 and normally holds it balanced against the fluid pressure difference acting on it. The servo piston is connected by a rod 29 to the metering needle 18, and serves to reduce the amount of fuel which returns to the tank 10 via the return pipe 17 on movement of the piston 27 towards the high pressure end of its cylinder, thus increasing the fuel flow to the nozzles 14. Movement of the servo piston in the other direction will increase the flow of fuel through the return pipe 17, and reduce the quantity delivered to the nozzles 14.

A centrifugal impeller 30, driven from the engine shaft 15 through gearing 31, has its eye connected to the return pipe 17 by a conduit 32 embodying a restriction 33. The conduit 32 communicates, via a pipe 34, with one side of a chamber 35 divided into two sections by a diaphragm 36. The effective outer radius of the impeller 30 is connected via a pipe 37 to the other side of the diaphragm chamber 35, a small orifice 38 in the diaphragm permitting of circulation of fuel through the impeller. The effective outer radius of the impeller is adjustable by means of a rotatable valve 39 having an off-centre orifice 40, movement of which valve can be effected by means of a cam 41 fixed to a shaft 42 carrying an arm 43 operated by a linkage from a pilot's speed-selecting lever (not shown). A follower 44, carried by an arm 45 fixed to a shaft 46, cooperates with the cam 41. Rotation of the shaft 46 is communicated to the valve 39 through bevel gearing 47. The diaphragm 36 is linked to a valve 48, located in the diaphragm chamber and controlling a conduit 49 leading from the low pressure end of the servo cylinder 23 to the low pressure side of the diaphragm chamber 35. A compression spring 50 at the low pressure side of the diaphragm 36 applies to the diaphragm 36 and to valve 48 a biasing pressure which normally balances the pressure difference developed by the impeller 30.

The servo piston 27 will adjust the fuel flow, through the agency of the metering needle 18, so that the engine runs at a speed such that the pressure difference across the diaphragm 36 balances the pressure of the spring 50, and the value of this speed will depend upon the effective outer radius of the impeller 30, which in turn depends on the setting of the arm 43 linked to the pilot's lever.

If the speed rises above the selected value, the diaphragm 36 will move to open the control valve 48, allowing the pressure at the low pressure end of the servo cylinder 23 to fall. The servo piston 29 will accordingly move against its spring 28 to reduce the fuel flow to the engine and restore the engine speed to the selected value. Similarly if the engine speed falls off, the spring 50 will move the diaphragm in the direction to close the control valve 48. This will enable pressure to build up at the low pressure end of the servo cylinder and move the piston 27 in the opposite direction to increase the fuel flow to the engine, and thus restore the selected engine speed.

Change in the effective outer radius of the impeller 30 will likewise effect a sympathetic change in pressure difference across the diaphragm 36, whereupon the servo piston 23 will react to alter the fuel flow and cause the engine to run at a speed, corresponding to the new position of the pilot's lever, at which the pressure difference developed by the impeller 30 again balances the pressure of the spring 50. Clearly the maximum effective outer radius of the impeller corresponds to slow running and the minimum effective outer radius to full power conditions. The arm 43 is shown in the slow running position SR, but can be moved clockwise towards the full power position FP to reduce the effective outer radius of the impeller through the agency of the cam 41 and valve 39.

Clockwise movement of the arm 43 to accelerate will reduce the pressure difference developed by the impeller 30 across the diaphragm 36 and therefore result in closing movement of the control valve 48. The response of the servo piston 27 is delayed by the restriction 25 in the by-pass pipe 24, and surging of the fuel into the engine, in quantity sufficient to endanger the turbine, is avoided. An adjustable stop 51 at the high pressure side of the diaphragm 36 engages with a member 52 carried by the diaphragm to prevent excessive opening movement of the control valve 48 and so regulates the deceleration period, a feature which can be used to damp the action of the governor and thereby prevent hunting.

The relationship between pilot's lever position and selected speed is determined by the contour of the cam 41. This may be so shaped as to give any desired relationship between pilot's lever position and the speed of the engine.

The pressure difference developed by the impeller will vary with the density of the fuel. It is desirable therefore to provide means for adjusting the maximum and minimum R. P. M. This may be effected by adjustment of adjustable stop screws 53 on the arm 43.

The apparatus includes a normally open minimum pressure valve 54 in the conduit 49 connecting the low pressure end of the cylinder and the diaphragm chamber. This valve 54 is carried by a diaphragm 55 subjected on one side to the pressure in the fuel delivery line 12 downstream from the spring loaded valve 19, this pressure being applied to the diaphragm 55 by a conduit 56. The diaphragm is subjected on the other side to combustion chamber pressure, applied through a conduit 57, and to the pressure of a spring 58. The valve 54 operates to control the servo piston 27 so as to maintain under conditions of low fuel flow, such as at high altitude and low engine R. P. M. a minimum pressure in the delivery line 12 to the spray nozzles 14. This is necessary to ensure, under these conditions, a sufficiently even fuel distribution over the delivery nozzles 14, having regard to the differences in hydraulic head over the distributing gallery 13, which may be as large in diameter as 3 feet. The differences in hydraulic head are unimportant at high delivery pressures but would be serious if the delivery pressure were allowed to fall below a safe minimum. The minimum pressure valve 54 is balanced to combustion chamber pressure and not to atmospheric pressure so as to prevent any possibility of reversal of fuel flow on sudden deceleration at altitude. Under these conditions, the rate of fuel flow is suddenly reduced by the movement of the control lever to decelerate, but owing to the inertia of the rotating parts, i. e. the compressor and turbine assembly, the engine takes some little time to slow down to the newly selected speed. While the engine is lagging behind the fuel, the combustion chamber pressure, which is determined by the compressor speed, remains at a higher value than that appropriate to the new rate of fuel flow, and under extreme conditions might be higher than the fuel inlet pressure were the latter balanced to atmospheric pressure.

When the pressure in the conduit 56 falls below the safe minimum, the valve 54 closes, thereby causing a rise in pressure at the low pressure end of the cylinder 22, whereupon the piston 27 will move to close the valve 18 and increase the fuel flow to the nozzles. Under these conditions the valve 54 overrides the action of the valve 48 controlled by the governor. As the diaphragm 55 is balanced to combustion chamber pressure, the valve 54 will close should there be any tendency for the combustion chamber pressure to exceed the fuel inlet pressure.

The installation shown in Fig. 2 is in substance the same as that of Fig. 1, but in this case there is no metering needle, the servo piston acting to vary the delivery of a variable displacement pump 111 through the agency of an arm 59. Clockwise movement of the arm 59 acts to reduce the fuel flow and anti-clockwise movement of the arm 59 to increase it. The shaft 46 carrying the follower 44 is in this case connected directly to the valve 39. The conduit 61, containing a restriction 33, serves to vent the eye of the impeller 30 to the suction side of the pump 111. A driving shaft 62 couples the pump 111 to the impeller 30.

In the arrangement shown in Fig. 3, a fixed delivery fuel pump 11 is used and, as in the case of Fig. 1, the servo piston 27 is coupled to a metering needle 18 for controlling the flow of fuel to the tank through a return pipe 17.

The centrifugal impeller and associated diaphragm are, however, replaced by a centrifugal governor 130 driven by the fuel pump 11. The force exerted by the governor 130 on the control valve 148 of the servomotor, to which it is connected as described below, is therefore independent of the density of the fuel. The control valve 148 of the servomotor controls a conduit 149 leading from the low pressure end of the servo cylinder 21 to the suction side of the pump and it is biased by a spring 150. A slotted lever 63 is pivoted at one end 64 to the valve 148 and a member 69 controlled by the governor weights 70 bears against the other end 71 of the lever 63. The lever 63 pivots on a central fulcrum constituted by a pin 72 engaging in its slot 73 and mounted on the free end of a lever 74 which turns on a fixed pivot 75 and can be adjusted by the cam 41 controlled by the pilot's lever so as to vary the position of the pin 72 in the slot 73. At slow running the pin 72 is at the end of the slot remote from the governor, as shown, the governor 130 then exerting the maximum effective leverage on the linkage connecting it to the valve 148. At full power the pin 72 is at the other end of the slot 73 so that the engine must run at a higher speed for the governor 130 to be able to exert sufficient force on the valve 148 to balance the pressure of the spring 150. An adjustable stop 151 is provided to limit the opening movement of the valve during periods of deceleration.

In this case the cam 41 is provided with adjustable lobes 62 for adjusting the maximum and minimum R. P. M. These replace the adjustable stop screws 53 of Fig. 1.

The arrangement shown in Fig. 4 is similar to that of Fig. 2 except that a fixed radius impeller 30 is used, the engine speed being varied by adjustment of a needle valve 80 controlling the effective area of an orifice 81 in a conduit 82 external to the impeller and connecting the eye and tip thereof. The valve stem carries a follower 84 held by a spring 83 against the cam 41. According to the position of the control lever 43, the cam 41 serves to open or close the valve 80 and thus vary the pressure difference developed by the impeller across the diaphragm 36. When the valve 80 is fully closed, the full pressure difference developed by the impeller 30 is exercised across the diaphragm and the selected speed is that for slow running. When the valve 80 is fully open, the pressure difference developed across the diaphragm 35 is a minimum and the selected speed is that corresponding to full power.

As pointed out above, the piston-type servomotors in the arrangements shown in the drawings can, if desired, be replaced by vane type servomotors.

What I claim as my invention and desire to secure by Letters Patent is:

1. In an internal combustion engine, the combination with a hydraulic servomotor comprising a servo member and a control valve for controlling the position of said servo member, of means for supplying fuel to the engine, means controlled by said servo member for controlling the rate of flow of fuel to the engine, a biasing device for applying under all conditions of engine speed a substantially constant biasing force to said control valve, an engine-driven centrifugal impeller, a pressure responsive device linked to the control valve, means for applying to opposite sides of the pressure responsive device the pressures at the tip and eye of said impeller respectively so that the pressure difference developed by the impeller acts in opposition to and balances the biasing force, and manually operable speed-selecting means for varying the relationship between engine speed and the pressure difference exerted by said impeller on the pressure responsive device and thereby changing the engine speed to a value at which said pressure difference again balances said biasing force.

2. In an internal combustion engine, the combination claimed in claim 1, wherein the speed-selecting means is constituted by a valve for varying the radius of discharge of the impeller.

3. In an internal combustion engine, the combination claimed in claim 1, comprising a conduit external to the impeller and connecting the eye and tip thereof, and a manually operable speed-selecting valve for varying the effective area of an orifice in said conduit and thereby the pressure difference developed by the impeller across the pressure responsive device.

4. In an internal combustion engine, the combination with a hydraulic servomotor comprising a servo member and a control valve for controlling the position of said servo member, of means for supplying fuel to the engine, means controlled by said servo member for controlling the rate of flow of fuel to the engine, a biasing device for applying under all conditions of engine speed a substantially constant biasing force to said control valve, a governor, a mechanical linkage connecting the governor and the control valve and enabling the governor to apply to said control valve a force which varies with engine speed and acts in opposition to said biasing force, so that said control valve will be displaced on variation in the engine speed, and thereby operate said servo member and flow controlling means to restore the engine speed to a selected value at which said force applied by the governor balances the biasing force, an adjustable fulcrum in said mechanical linkage, and manually operable speed selecting means for adjusting said fulcrum to alter the relationship between engine speed and said force applied by the governor and thereby changing the selected engine speed.

5. In an internal combustion engine, the combination with a hydraulic servomotor comprising a servo member, a housing for said servo member, a restricted by-pass conduit connecting opposite ends of said housing, means for establishing a pressure difference across said servo member, a spring for balancing the servo member against said pressure difference, a leakage orifice at the low pressure end of said housing, and a control valve for controlling the effective area of said leakage orifice and thereby controlling the position of said servo member in said housing, of means for supplying fuel to the engine, means controlled by said servo member for controlling the rate of flow of fuel to the engine, a manually operable speed selecting member, a biasing device for applying to said control valve a biasing force which remains substantially constant whatever the selected engine speed, a governor for applying to said control valve an opposing force which varies with engine speed and acts in opposition to said biasing force, said governor serving to displace said control valve, on variation in the engine speed from the selected value, and thereby operate said servo member and flow controlling means to restore the engine speed to the selected value at which said force applied by the governor balances the biasing force, and manually operable speed-selecting means for adjusting the relationship between engine speed and the force applied by the governor to the control valve, and thereby changing the selected engine speed to a value at which said force again balances said constant biasing force, said control valve operating to reduce the effective area of said leakage orifice on accelerating movement of said speed selecting means and the responsive movement of said servo member being retarded by said restricted by-pass conduit.

6. In an internal combustion engine, the combination of a hydraulic servomotor comprising a servo member, means for establishing a pressure difference across the servo member of said servomotor, and a spring for balancing the servo member against said pressure difference, a control valve which is movable to change said pressure difference and thereby effect corresponding movement of said servo member, means for supplying fuel to the engine, means controlled by said servo member for controlling the rate of flow of fuel to the engine, a manually operable speed selecting member, a biasing device for applying to said control valve a biasing force which remains substantially constant whatever the selected engine speed, a governor for applying to said control valve an opposing force which varies with engine speed and acts in opposition to said biasing force, said governor serving to displace said control valve, on variation in the engine speed from the selected value and thereby operate said servo member and flow controlling means to restore the engine speed to the selected value at which said force applied by the governor balances the biasing force, manually operable speed-selecting means for adjusting the relationship between engine speed and the force applied by the governor to the control valve, and thereby changing the selected engine speed to a value at which said force again balances said constant biasing force, a normally ineffective minimum pressure valve, and a pressure-sensitive device exposed to the fuel pressure at the inlet to the engine, said pressure sensitive device operating said minimum pressure valve to override said control valve and reduce the pressure difference across said servo member when said fuel pressure falls below a predetermined minimum value.

7. In an internal combustion engine, the combination, with a hydraulic servomotor, comprising a servo member movable in an appropriately shaped housing and a control valve, of means controlled by the servomotor for varying the rate of flow of fuel to the engine, a spring for applying to the control valve a biasing force which remains substantially constant whatever the selected engine speed, an engine-driven centrifugal impeller, means for applying to the control valve in opposition to the biasing force the hydraulic pressure difference developed by said impeller, said servo member acting in response to variations in the pressure difference so developed to adjust the fuel flow so as to maintain the engine speed at a selected value at which the pressure difference applied to the control valve by the impeller balances the biasing force, and manually operable speed-selecting means for varying the relationship between engine speed and the pressure difference applied by the impeller to the control valve, and thereby changing the selected engine speed to a valve at which said pressure difference once more balances said biasing force.

8. In an internal combustion engine, the combination with a hydraulic servomotor comprising a servo member and a control valve for controlling the position of said servo member, of means for supplying fuel to the engine, means controlled by said servo member for controlling the rate of flow of fuel to the engine, a manually operable speed selecting member, a biasing device for applying to said control valve a biasing force which remains substantially constant for all engine speeds selected by said speed selecting member, a governor, coupled to and driven by the engine, for maintaining the engine running at the speed selected by said speed selecting member, means controlled by said governor for applying to said control valve an opposing force which is determined by the engine speed and acts in opposition to and normally balnces said constant biasing force, said control valve moving, in response to change in said opposing force on deviation of the engine speed from the selected value, to displace said servo member and flow controlling means to restore the engine speed to the selected value, and means, coupled to and movable by the speed selecting member, for varying the relation between engine speed and the opposing force applied to said control valve by said governor controlled means and thereby actuating said control valve, servo member and flow controlling means to change the engine speed to a selected new value at which said opposing force is again in balance with said constant biasing force.

9. In an internal combustion engine, the combination with a hydraulic servomotor comprising a servo member, means for establishing a pressure difference across said servo member, a spring for balancing the servo member against said pressure difference, and a control valve for controlling said pressure difference and movable to change said pressure difference and thereby to vary the position of said servo member, of means for supplying fuel to the engine, means controlled by said servo member for controlling the rate of flow of fuel to the engine, a manually operable speed selecting member, a biasing device for applying to said control valve a biasing force which remains substantially constant for all engine speeds selected by said speed selecting member, a governor, coupled to and driven by the engine, for maintaining the engine running at the speed selected by said speed selecting member, means controlled by said governor for applying to said control valve an opposing force which is determined by the engine speed and acts in opposition to and normally balances said constant biasing force, said control valve moving, in response to change in said opposing force on deviation of the engine speed from the selected value, to displace said servo member and flow controlling means to restore the engine speed to the selected value, and means, coupled to and movable by the speed selecting member, for varying the relation between engine speed and the opposing force applied to said control valve by said governor controlled means and thereby actuating said control valve, servo member and flow controlling means to change the engine speed to a selected new value at which said opposing force is again in balance with said constant biasing force.

10. In an internal combustion engine, the combination with a hydraulic servomotor comprising a servo member and a control valve for controlling the position of said servo member, of a fixed delivery fuel pump for feeding fuel to the engine, a metering valve for controlling the rate of flow of said fuel, an operative connection between said servo member and said metering valve, a manually operable speed selecting member, a biasing device for applying to said control valve a biasing force which remains substantially constant for all engine speeds selected by said speed selecting member, a governor, coupled to and driven by the engine, for maintaining the engine running at the speed selected by said speed selecting member, means controlled by said governor for applying to said control valve an opposing force which is determined by the engine speed and acts in opposition to and normally balances said constant biasing force, said control valve moving, in response to change in said opposing force on deviation of the engine speed from the selected value, to displace said servo member and flow controlling means to restore the engine speed to the selected value, and means, coupled to and movable by the speed selecting member, for varying the relation between engine speed and the opposing force applied to said control valve by said governor controlled means and thereby actuating said control valve, servo member and flow controlling means to change the engine speed to a selected new value at which said opposing force is again in balance with said constant biasing force.

11. In an internal combustion engine, the combination with a hydraulic servomotor comprising a servo member and a control valve for controlling the position of said servo member, of a variable delivery fuel pump for feeding fuel to the engine, means controlled by said servo member for varying the delivery of said pump and therefore the rate of flow of fuel to the engine, a manually operable speed selecting member, a biasing device for applying to said control valve a biasing force which remains substantially constant for all engine speeds selected by said speed selecting member, a governor, coupled to and driven by the engine, for maintaining the engine runing at the speed selected by said speed selecting member, means controlled by said governor for applying to said control valve an opposing force which is determined by the engine speed and acts in opposition to and normally balances said constant biasing force, said control valve moving, in response to change in said opposing force on deviation of the engine speed from the selected value, to displace said servo member and flow controlling means to restore the engine speed to the selected value, and means, coupled to and movable by the speed selecting member, for varying the relation between engine speed and the opposing force applied to said control valve by said governor controlled means and thereby actuating said control valve, servo member and flow controlling means to change the engine speed to a selected new value at which said opposing force is again in balance with said constant biasing force.

12. In an internal combustion engine having a combustion chamber, the combination claimed in claim 9, comprising a normally ineffective minimum pressure valve, and a pressure-sensitive device exposed at one side to the fuel pressure at the inlet to the engine, means for applying to the other side of said pressure sensitive device the pressure prevailing in the combustion chamber of the engine, said pressure sensitive device operating said minimum pressure valve to override the control valve and reduce the pressure difference across the servo member when said fuel pressure falls below a predetermined minimum value.

13. In an internal combustion engine, the combination with a hydraulic servomotor comprising a servo member and a control valve for controlling the position of said servo member, of means for supplying fuel to the engine, means controlled by said servo member for controlling the rate of flow of fuel to the engine, a manually operable speed selecting member, a spring for applying to said control valve a biasing force which remains substantially constant for all engine speeds selected by said speed selecting member, a governor, coupled to and driven by the engine, for maintaining the engine running at the speed selected by said speed selecting member, means controlled by said governor for applying to said control valve an opposing force which is determined by the engine speed and acts in opposition to and normally balances said constant biasing force, said control valve moving, in response to change in said opposing force on deviation of the engine speed from the selected value, to displace said servo member and flow controlling means to restore the engine speed to the selected value, and means, coupled to and movable by the speed selecting member, for varying the relation between engine speed and the opposing force applied to said control valve by said governor controlled means and thereby actuating said control valve, servo member and flow controlling means to change the engine speed to a selected new value at which said opposing force is again in balance with said constant biasing force.

LEONARD SIDNEY GREENLAND.

REFERENCES CITED

The following references are of record in the file of this patent:

UNITED STATES PATENTS

| Number | Name | Date |
|---|---|---|
| 1,772,403 | Smoot | Aug. 5, 1930 |
| 1,839,915 | Chorlton | Jan. 5, 1932 |
| 2,276,794 | Ricci | Mar. 17, 1942 |
| 2,405,888 | Holley | Aug. 13, 1946 |
| 2,407,115 | Udale | Sept. 3, 1946 |
| 2,412,289 | Pugh et al. | Dec. 10, 1946 |
| 2,424,035 | Ifield | July 15, 1947 |
| 2,440,663 | Ifield | Apr. 27, 1948 |
| 2,441,948 | Atkinson | May 25, 1948 |
| 2,446,523 | Bradbury et al. | Aug. 10, 1948 |